(12) United States Patent
Wang

(10) Patent No.: US 9,726,801 B2
(45) Date of Patent: Aug. 8, 2017

(54) BACKLIGHT UNIT AND A DISPLAY DEVICE

(71) Applicant: Boe Technology Group Co., Ltd., Beijing (CN)

(72) Inventor: Shang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/786,258

(22) PCT Filed: Mar. 5, 2015

(86) PCT No.: PCT/CN2015/073695
§ 371 (c)(1),
(2) Date: Oct. 22, 2015

(87) PCT Pub. No.: WO2016/074379
PCT Pub. Date: May 19, 2016

(65) Prior Publication Data
US 2016/0356939 A1 Dec. 8, 2016

(30) Foreign Application Priority Data
Nov. 10, 2014 (CN) .......................... 2014 1 0643547

(51) Int. Cl.
F21V 8/00 (2006.01)

(52) U.S. Cl.
CPC ............ *G02B 6/0021* (2013.01); *G02B 6/008* (2013.01); *G02B 6/0018* (2013.01);
(Continued)

(58) Field of Classification Search
CPC .. G02B 6/0021; G02B 6/0031; G02B 6/0055; G02B 6/008; G02B 6/0085
See application file for complete search history.

(56) References Cited

U.S. PATENT DOCUMENTS

2006/0262397 A1 11/2006 Lee et al.
2008/0316390 A1 12/2008 Lin
(Continued)

FOREIGN PATENT DOCUMENTS

CN 2421510 2/2001
CN 2687711 3/2005
(Continued)

OTHER PUBLICATIONS

International Search Report and Written Opinion from PCT/CN2015/073695 dated Aug. 14, 2015.
(Continued)

*Primary Examiner* — Thomas M Sember
(74) *Attorney, Agent, or Firm* — Calfee, Halter & Griswold LLP

(57) ABSTRACT

The present invention relates to the field of display technology, particularly to a backlight unit and a display device. The backlight unit according to the present invention comprises: a light guide plate, the light guide plate comprising a first inclined side and an upper bottom surface and a lower bottom surface parallel with each other, wherein the angle between the first inclined side and the lower bottom surface is a sharp angle; a light emitting element arranged below the first inclined side; and a first reflector arranged on a surface of the first inclined side of the light guide plate. Compared with the prior art, the thickness of such a backlight unit can be kept relatively small, which facilitates lighter and thinner design of the liquid crystal display.

14 Claims, 3 Drawing Sheets

(52) U.S. Cl.
CPC .......... *G02B 6/0031* (2013.01); *G02B 6/0055* (2013.01); *G02B 6/0085* (2013.01)

(56) References Cited

U.S. PATENT DOCUMENTS

| | | | | |
|---|---|---|---|---|
| 2009/0284956 A1* | 11/2009 | Gomi | .................... | G02B 6/0018 362/97.3 |
| 2010/0182536 A1 | 7/2010 | Karakawa | | |
| 2013/0135843 A1* | 5/2013 | Chen | ...................... | G02B 6/008 362/97.1 |

FOREIGN PATENT DOCUMENTS

| | | |
|---|---|---|
| CN | 201081152 | 7/2008 |
| CN | 102081187 | 6/2011 |
| CN | 102518980 | 6/2012 |
| CN | 102590927 | 7/2012 |
| CN | 102667310 | 9/2012 |
| CN | 102980105 | 3/2013 |
| CN | 103017037 | 4/2013 |
| CN | 204100057 | 1/2015 |
| CN | 104359051 | 2/2015 |
| CN | 104749818 | 7/2015 |
| JP | 2012123995 | 6/2012 |

OTHER PUBLICATIONS

Office action from Chinese Application No. 201410643547.3 dated Sep. 1, 2016.
Office action from Chinese Application No. 201410643547.3 dated Mar. 17, 2016.

* cited by examiner

BACKLIGHT UNIT AND A DISPLAY DEVICE

RELATED APPLICATIONS

The present application is the U.S. national phase entry of PCT/CN2015/073695, filed Mar. 5, 2015, which claims the benefit of Chinese Patent Application No. 201410643547.3, filed Nov. 10, 2014, the entire disclosures of which are incorporated herein by reference.

FIELD OF THE INVENTION

The present invention relates to the field of display technology, particularly to a backlight unit and a display device.

BACKGROUND OF THE INVENTION

The liquid crystal display (LCD) is a passive light emitting device, a backlight unit (BLU) is required to provide a light source to the liquid crystal display to enable it to display images. At present, the backlight technologies mainly used by the liquid crystal display include: a cold cathode fluorescent lamp (CCFL) and a light emitting diode (LED). Since the LED backlight has lots of advantages of high luminance, high color purity, long lifetime, good reliability and no mercury pollution etc., it occupies an increasingly large proportion in the use of the backlight.

The LED backlight liquid crystal display can be classified into a straight down type and a side entry type according to the position of the LED backlight. FIG. 1 shows a structural schematic view of a side entry type backlight display device of the prior art. As shown in FIG. 1, a backlight unit arranged at a side of a display panel 10 comprises a light guide plate 11, an LED strip light 12 located at the side of the light guide plate 11, and a reflector 13 located at the back of the light guide plate 11. After the light emitted by the LED strip light 12 is incident into the light guide plate 11, via reflection by the reflector 13 and scattering by the light guide plate 11, the light is propagated to the light exit side of the display panel 10, so as to achieve the aim of providing a light source to the liquid crystal display to enable it to display images.

In the side entry type liquid crystal display of the prior art, in order to increase the utilization rate of the light emitted by the LED strip light 12, the thickness H of the light guide plate 11 is generally slightly greater than the width h of the LED strip light 12 in the design and fabrication process. However, in this way, the thickness of the light guide plate 11 will be increased, thereby enabling the thickness of the backlight unit to be enlarged, which does not conform to the design trend of ultra-thinness of the display.

SUMMARY OF THE INVENTION

In order to overcome the above problem and reduce the thickness of the display so as to facilitate the thinness design, the present invention provides an improved backlight unit and a display device.

According to a first aspect of the present invention, a backlight unit is provided, comprising:

a light guide plate, the light guide plate comprising a first inclined side and an upper bottom surface and a lower bottom surface parallel with each other, wherein the angle between the first inclined side and the lower bottom surface is a sharp angle;

a light emitting element, the light emitting element being arranged below the first inclined side; and a first reflector, the first reflector being arranged on a surface of the first inclined side.

In the backlight unit according to the present invention, a corresponding part below the first inclined side within the light guide plate is used for arranging a light emitting element, the other part may be used for implementing the light guide function; in addition, since the angle between the first inclined side and the lower bottom surface is a sharp angle, the angle between the first reflector arranged below the first inclined side of the light guide plate and the lower bottom surface is also a sharp angle, thus the light emitted by the light emitting element, after being reflected at the first reflector that is obliquely arranged, will be incident into the part within the light guide plate for implementing the light guide function. Hence, in the process of realizing the side entry type backlight, it does not have to place the light emitting element vertically as the prior art so as to enable all the light emitting surfaces thereof to face towards the side of the light guide plate, instead, the light emitting element can be placed laterally, and the side entry type backlight can be realized only by enabling the light emitted by it to be incident to the first inclined side. Therefore, compared with the prior art, the backlight unit according to the present invention reduces the vertical occupation space of the light emitting element, thereby, in the fabrication process, the thickness of the light guide plate is reduced, so as to meet the design trend of ultra-thinness of the display device.

In an embodiment of the backlight unit according to the present invention, a first groove is arranged at a position of the lower bottom surface of the light guide plate below the first inclined side, and the light emitting element is arranged within the first groove.

In an embodiment of the backlight unit according to the present invention, the shape of the first reflector is same as the shape of the first inclined side.

In an embodiment of the backlight unit according to the present invention, the backlight unit may further comprise: a second reflector arranged on the lower bottom surface of the light guide plate, thereby further increasing utilization rate of the light. Further, the backlight unit may further comprise a heat sink arranged at the underside of the second reflector, for dissipating heat generated by the light emitting element in the light emitting phase, so as to prevent the backlight unit from generating adverse impact to the liquid crystal layer or the control circuit in the display panel due to too much heat within the backlight unit.

In an embodiment of the backlight unit according to the present invention, an opening is arranged at a position of the second reflector corresponding to the light emitting element for exposing the light emitting element, and the backlight unit further comprises a first heat conduction reflector arranged at the opening and fitted with the light emitting element, which can not only reflect light but also can conduct the heat generated by the light emitting element to the heat sink.

In an embodiment of the backlight unit according to the present invention, the side of the light guide plate opposite to the first inclined side is a second inclined side, the second inclined side has a same shape as the first inclined side, and the second inclined side and the first inclined side are parallel with each other.

In an embodiment of the backlight unit according to the present invention, the backlight unit comprises at least two mutually spliced light guide plates, the first reflector is clamped between the second inclined side of one of two adjacent light guide plates and the first inclined side of the other light guide plate. Further, the first reflector clamped between the two adjacent light guide plates may be a double side reflector, so as to facilitate to increase utilization rate of the light.

In an embodiment of the backlight unit according to the present invention, the light emitting element comprises a control circuit board and an LED chip arranged on the control circuit board, wherein a light exit side of the LED chip faces towards the first inclined side. Preferably, the backlight unit further comprises: a second heat conduction reflector, the second heat conduction reflector being arranged at a side of the LED chip close to the first inclined side.

In an embodiment of the backlight unit according to the present invention, the light guide plate has a gap at the junction of the first inclined side and the lower bottom surface, and the backlight unit further comprises a wedge-shaped block for filling the gap, wherein the light emitting element is arranged on a gap inclined surface of the wedge-shaped block formed between the first inclined side and the lower bottom surface. Further, a second groove may be arranged at the gap inclined surface, and the light emitting element is arranged within the second groove.

In an embodiment of the backlight unit according to the present invention, the first inclined side may be a flat surface or a curved surface. When the first inclined side is a curved surface, since the curved surface has a relatively large contact area with the light emitted by the light emitting element relative to the flat surface, which is benefit for reflecting more incident light into the light guide area of the light guide plate.

According to a second aspect of the present invention, a display device comprising a backlight unit as stated above is provided.

BRIEF DESCRIPTION OF THE DRAWINGS

In order to explain the technical solutions in the embodiments of the present invention or the prior art more clearly, the drawings to be used in the description of the embodiments or the prior art will be introduced briefly next. Apparently, the drawings described below are only some embodiments of the present invention, and, for the ordinary skilled person in the art, other drawings can be further obtained from these drawings on the premise of not paying any creative work.

REFERENCE SIGNS

01—backlight unit; 02—display panel; 10—display panel; 11—light guide plate; 110—upper bottom surface; 111—lower bottom surface; 12—LED strip light; 13—reflector; 20—light emitting element; 201—control circuit board; 202—LED chip; 203—yellow fluorescent powder layer; 21—first reflector; 22—second reflector; 23—heat sink; 24—first heat conduction reflector; 25—second heat conduction reflector; 27—wedge-shaped block; A—first inclined side of the light guide plate; B—second inclined side of the light guide plate; C—gap inclined surface; E—light source arrangement area of the light guide plate; F—light guide area of the light guide plate; G—the side of the LED chip close to the first inclined side; O-O'—light entry side of the light guide plate.

DETAILED DESCRIPTION OF THE INVENTION

Next, the technical solutions in the embodiments of the present invention will be described clearly and completely in combination with the drawings in the embodiments of the present invention. Apparently, the embodiments described are only part of, rather than all of the embodiments of the present invention. Based on the embodiments in the present invention, all other embodiments obtained by the ordinary skilled person in the art on the premise of not paying any creative work belong to the protection scope of the present invention.

Figure 1:
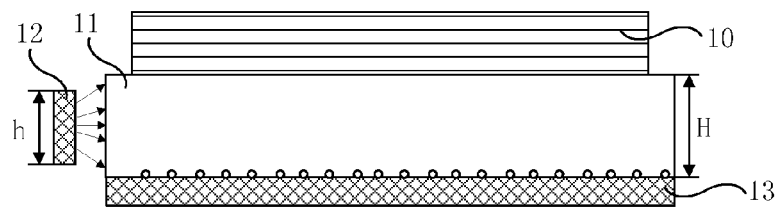
FIG. 1 is a structural schematic view of a side entry type backlight liquid crystal display device of the prior art.

FIG. 1 shows a structural schematic view of a side entry type backlight liquid crystal display of the prior art. As stated above, in the side entry type liquid crystal display of the prior art, in order to increase the utilization rate of the light emitted by the LED strip light 12, the thickness H of the light guide plate 11 is generally slightly greater than the width h of the LED strip light 12 in the design and fabrication process. However, in this way, the thickness of the light guide plate 11 will be increased, thereby enabling the thickness of the backlight unit to be enlarged, which does not conform to the design trend of ultra-thinness of the liquid crystal display.

In order to solve the above problem, the present invention provides a backlight unit different from the prior art. The backlight unit of the present invention will be described in detail through several specific embodiments next.

Figure 2A:
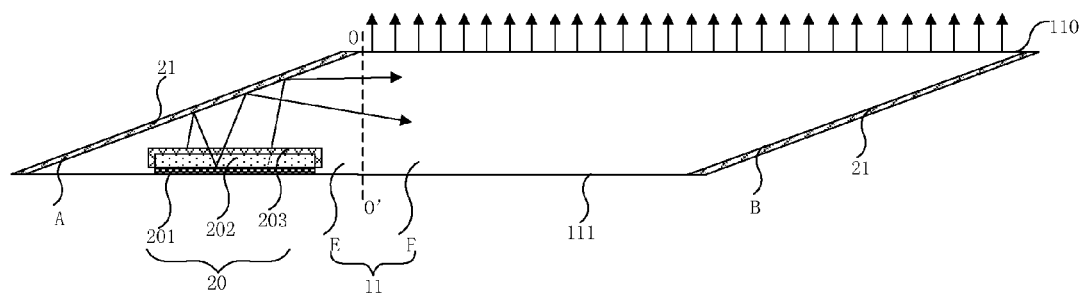
FIG. 2a is a structural schematic view of a backlight unit according to a first embodiment of the present invention.
Figure 2B:
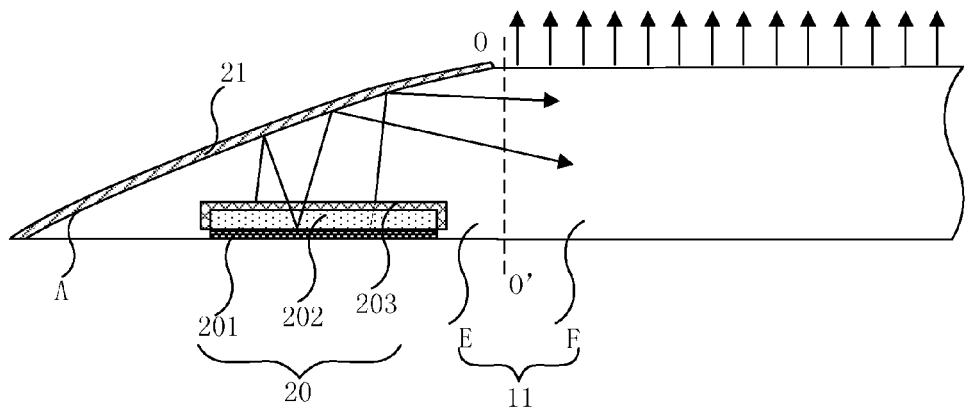
FIG. 2b is a local structural schematic view of a backlight unit according to a first embodiment of the present invention.

FIGS. 2a and 2b show a structural schematic view and a local structural view of a backlight unit according to a first embodiment of the present invention respectively. As shown in FIG. 2a, the backlight unit comprises:

a light guide plate 11 comprising a first inclined side A and an upper bottom surface 110 and a lower bottom surface 111 parallel with each other, wherein the angle between the first inclined side A and the lower bottom surface 111 is a sharp angle;

a light emitting element 20 arranged below the first inclined side A;

a first reflector 21 arranged on a surface of the first inclined side A.

In the backlight unit as shown in FIG. 2a, a corresponding part below the first inclined side A within the light guide plate is used for arranging a light emitting element, and then, the other part may be used for implementing the light guide function. In addition, since the angle between the first inclined side A and the lower bottom surface 111 is a sharp angle, the angle between the first reflector 21 arranged under the first inclined side A of the light guide plate 11 and the lower bottom surface 111 is also a sharp angle, thus the light emitted by the light emitting element 20, after being reflected at the first reflector 21 that is obliquely arranged, will be incident into the part within the light guide plate 11 for implementing the light guide function. Hence, in the process of realizing the side entry type backlight, it does not have to place the light emitting element 20 vertically as the prior art so as to enable all the light emitting surfaces thereof to face towards the side of the light guide plate 11, instead, the light emitting element 20 can be placed laterally, the side entry type backlight can be realized only by enabling the light emitted by it to be incident to the first inclined side A, as shown in FIG. 2a. Therefore, compared with the prior art, the backlight unit as shown in FIG. 2a reduces the vertical occupation space of the light emitting element 20, thereby, in the fabrication process, the thickness of the light guide plate 11 is reduced, as a result, the design trend of ultra-thinness of the display device is met.

In the backlight unit according to a first embodiment of the present invention as shown in FIG. 2a or 2b, the light emitting element 20 may be a luminescent film, or the light emitting element 20 may comprise a control circuit board 201 and an LED chip 202 arranged on the control circuit board 201. The light exit side of the LED chip 202 faces towards the first inclined side A. The present invention makes no limitation to the light emitting element 20, however, for the convenience of describing it more clearly, the following embodiments will be explained by taking the example that the light emitting element 20 comprises a control circuit board 201 and an LED chip 202. Specifically, when the light emitting element 20 is a luminescent film, the light emitting element 20 can be attached to the position of the lower bottom surface 111 corresponding to the first inclined side A. When the light emitting element 20 comprises the control circuit board 201 and the LED chip 202, a first groove (not shown in FIGS. 2a and 2b) can be arranged at a position of the lower bottom surface 111 of the light guide plate 11 under the first inclined side A, and then the light emitting element 20 is arranged within the first groove, so as to facilitate the light emitting element 20 to be arranged below the first inclined side A more stably.

In the backlight unit according to a first embodiment of the present invention as shown in FIG. 2a or 2b, it should be pointed out that the light guide plate 11 can be divided into two areas according to the function: the corresponding part below the first inclined side A within the light guide plate 11 is used for arranging the light emitting element 20, which is called a light source arrangement area E thereinafter; the area other than the light source arrangement area E in the light guide plate 11 is used for implementing the light guide function, which is called a light guide area F thereinafter. The light emitted from the light source arrangement area E is incident to the light guide area F, hence, the position where the boundary line O-O' of the light guide area F and the light source arrangement area E locates can be called the light entry side of the light guide plate 11.

In the backlight unit according to a first embodiment of the present invention as shown in FIG. 2a or 2b, the first inclined side A can be a flat surface as shown in FIG. 2a, or a curved surface as shown in FIG. 2b. Since the curved surface has a relatively large contact area with the light emitted by the light emitting element 20 relative to the flat surface, it can reflect more incident light so as to enable it to enter the light guide area F of the light guide plate 11.

In order to enable the backlight unit as shown in FIG. 2a or 2b to provide white backlight, generally, the encapsulation manner of the LED chip 202 can use red, blue, green LED chips 202 so that they emit red light, blue light and green light respectively, thereby being mixed into white light. Or, a ultraviolet LED chip 202 can be used and the surface of the light exit side of the LED chip 202 is covered with red, blue or green fluorescent powder layers, such that the ultraviolet LED chip 202 excites the red, green and blue fluorescent powder to generate white light. Or further, as shown in FIG. 2a or 2b, in the event that the LED chip 202 is a blue light chip, the surface of the light exit side of the LED chip 202 can be covered with a yellow fluorescent powder layer 203. The yellow fluorescent powder layer 203 is excited using the blue light emitted by the LED chip 202 to generate yellow light, the yellow light is mixed with the blue light to generate the white light. The present invention makes no definition on the encapsulation manner of the LED chip 202.

In the backlight unit according to a first embodiment of the present invention as shown in FIG. 2a or 2b, the shape of the first reflector 21 can be same as the shape of the first inclined side A, thereby improving fit degree of the first reflector 21 and the first inclined side A, and avoiding the phenomenon of leakage of light emitted by the light emitting element 20 from the gap at the junction of the first reflector 21 and the first inclined side A. In addition, the material constituting the first reflector 21 can include at least one of a metal aluminum, a metal tin or a metal silver. The method for fabricating the first reflector 21 can be a plating method, i.e., plating a layer of metal thin film constituted by the above metal material on the surface of the first inclined side A, so as to form the first reflector 21. Or, a metal film layer that has been fabricated is attached to the surface of the first inclined side A.

In the backlight unit according to a first embodiment of the present invention as shown in FIG. 2a or 2b, the side of the light guide plate 11 opposite to the first inclined side A is a second inclined side B, the second inclined side B has the same shape as the first inclined side A, and the second inclined side and the first inclined side are parallel with each other, thus, the first inclined side A and the second inclined side B have the same shape and the same inclined direction. For example, when the shape of the first inclined side A is a curved surface, the shape of the second inclined side B is a curved surface with the same curve direction and curvature as the first inclined side A. Moreover, the sum of the angle between the first inclined side A and the lower bottom surface 111 and the angle between the second inclined side B and the lower bottom surface 111 is 180°.

Figure 3A:
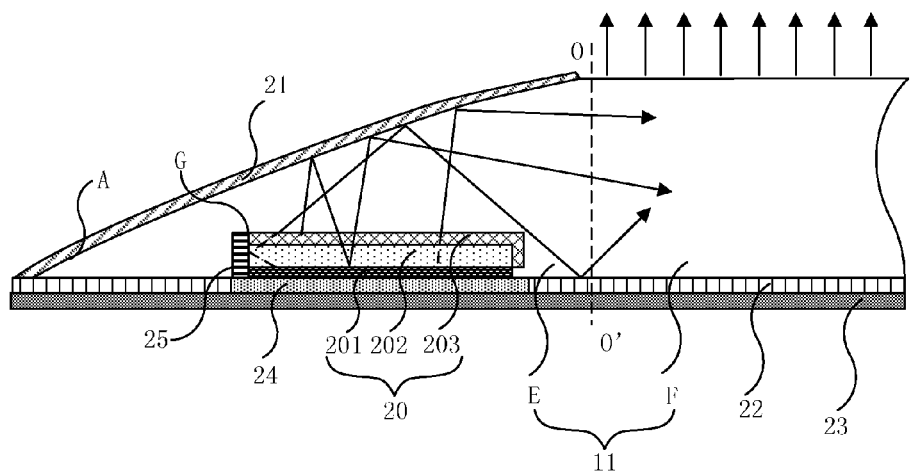
FIG. 3a is a local structural schematic view of a backlight unit according to a second embodiment of the present invention.

FIG. 3a shows a local structural schematic view of a backlight unit according to a second embodiment of the present invention. As shown in FIG. 3a, the backlight unit may further comprise a second reflector 22 arranged on the lower bottom surface 111 of the light guide plate 11. Through the second reflector 22, the light reflected by the first reflector 21 to the lower bottom surface 11 of the light guide plate 11 can be reflected again, to enable it to be incident into the light guide area F of the light guide plate 11, thereby increasing utilization rate of the light.

In the backlight unit according to the second embodiment of the present invention as shown in FIG. 3a, the backlight unit may further comprise a heat sink 23 arranged at the underside of the second reflector 22, for dissipating the heat generated by the light emitting element 20 in the luminescent phase, so as to prevent the backlight unit from generating adverse impact to the liquid crystal layer or the control circuit in the display panel due to too much heat within the backlight unit.

It should be noted that the material constituting the second reflector 22 can be same as the material constituting the first reflector 21, i.e., at least one of the metal aluminum, the metal tin or the metal silver can be used. In order to reduce the fabrication cost, the metal aluminum can generally used to fabricate the first reflector 21 or the second reflector 22. However, since the heat conduction performance of the metal aluminum is not good, when the second reflector 22 is fabricated using the metal aluminum, the heat sink 23 cannot play the heat dissipation function effectively.

Therefore, an opening (not shown in the figure) can be arranged at a position of the second reflector 22 corresponding to the light emitting element 20 for exposing the light emitting element 20. In this way, as shown in FIG. 3a, a first heat conduction reflector 24 fitted with the light emitting element 20 can be arranged at said opening. The first heat conduction reflector 24 can not only reflect light but also can conduct the heat generated by the light emitting element 20 to the heat sink 23, thereby avoiding a high temperature from being generated within the backlight unit 01, wherein the material constituting the first heat conduction reflector 24 can be at least one of the metal tin or the metal silver.

In the backlight unit according to the second embodiment of the present invention as shown in FIG. 3a, even if the light emitted from the side G of the LED chip 202 close to the first inclined side A is reflected at the surface of the first reflector 21, it is also difficult for the reflected light to be incident to the light guide area F of the light guide plate 11 because it is blocked by the light emitting element 20 itself. Therefore, a second heat conduction reflector 25 can be arranged at the side G of the LED chip 202 close to the first inclined side A, to reflect the light emitted from the side G of the LED chip 202 to other light exit sides of the light emitting element 20, so as to increase utilization rate of the light. Wherein the material constituting the second heat conduction reflector 25 can be same as the material constituting the first heat conduction reflector 24, i.e., at least one of the metal tin or the metal silver can be used. In this way, the second heat conduction reflector 25 can not only reflect the light emitted by the light emitting element 20, but also can conduct the heat generated by the light emitting element 20 to the heat sink 23, thereby avoiding a high temperature from being generated within the backlight unit.

Figure 3B:
FIG. 3b is a structural schematic view of a display device according to an embodiment of the present invention.

When the backlight unit according to the above embodiment of the present invention is applied in a relatively large display device, a plurality of such backlight units can be spliced, and then assembled with the display panel. FIG. 3b shows a structural schematic view of a display device formed by splicing a plurality of backlight units 01 according to the second embodiment of the present invention as shown in FIG. 3a and then assembling with the display panel 02.

Figure 4A:
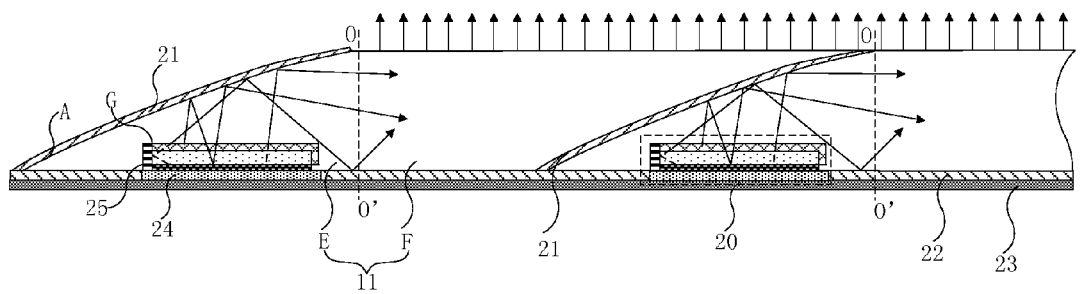
FIG. 4a is a local structural schematic view of a backlight unit according to a third embodiment of the present invention.

FIG. 4a shows a local structural schematic view of a backlight unit according to a third embodiment of the present invention. As shown in FIG. 4a, the backlight unit may comprise at least two mutually spliced light guide plates 11, the first reflector 21 is clamped between the second inclined side B of one of two adjacent light guide plates 11 and the first inclined side A of the other light guide plate 11.

Wherein the first reflector 21 clamped between the two adjacent light guide plates 11 may be a double side reflector. Thus the double side reflector can not only reflect again the light reflected by the first reflector 21 in the light guide plate 11 located at the left side to the lower bottom surface 111 of the light guide plate 11, to enable it to be incident into the light guide area F of the left light guide plate 11, thereby increasing utilization rate of the light, but also can reflect the light emitted by the light emitting element 20 in the right light guide plate 11 into the light guide area F of the right light guide plate 11.

Figure 4B:
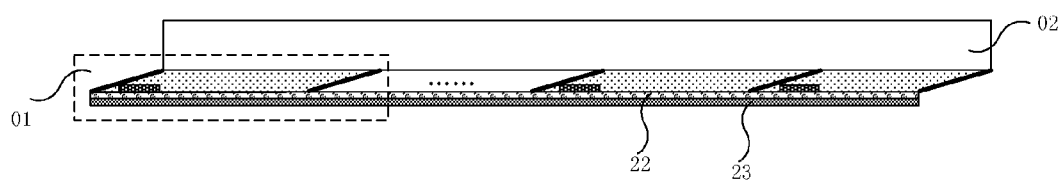
FIG. 4b is a structural schematic view of a display device according to another embodiment of the present invention.

As shown in FIG. 3b, when the backlight unit according to the first or the second embodiment is applied in a relatively large display device, it may be required to splice a plurality of such backlight units. However, it can be assumed that a large backlight unit can be formed directly when fabricating the backlight unit, then the large backlight unit is assembled with the display panel to form the display device, thus the step of splicing a plurality of backlight units is omitted. As shown in FIG. 4a, in the process of fabricating the backlight unit 01, a plurality of light guide plates 11 can be spliced; then, a whole layer of second reflectors 22 is fabricated on the lower bottom surfaces 111 of the plurality of spliced light guide plates 11, when the second reflector 22 is fabricated using the metal aluminum, an opening can be fabricated at the position of the whole layer of the second reflectors 22 corresponding to the plurality of light emitting elements 20 in the plurality of light guide plates 11, so as to form a first heat conduction reflector 24 fitted with each light emitting element 20 at the opening; subsequently, a whole layer of heat sinks 23 can be formed on the surface of the side of the second reflector 22 away from the light guide plate 11, so as to avoid the backlight unit 01 from generating too much heat in the process of use. In this way, the backlight unit having a plurality of spliced light guide plates 11 as shown in FIG. 4a is formed. FIG. 4b shows a structural schematic view of a display device formed by assembling the backlight unit 01 according to the third embodiment of the present invention as shown in FIG. 4a with the display panel 02. Consequently, as shown in FIG. 4b, applying the backlight unit 01 according to the third embodiment of the present invention as shown in FIG. 4a into a relatively large display device can simplify the process and avoid the generation of the undesired phenomenon such as imprecision of the splicing caused by splicing process error when splicing a plurality of backlight units 01 according to the first or second embodiment of the present invention as shown in FIG. 3b.

Figure 5:
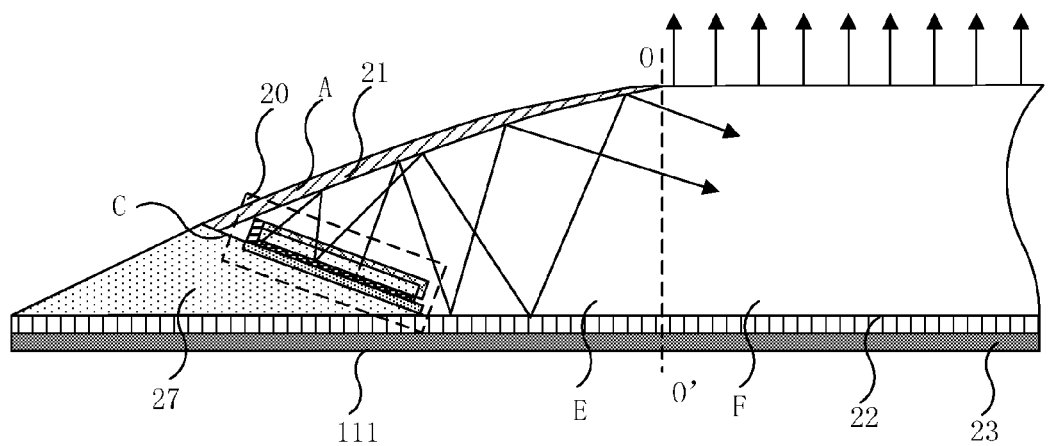
FIG. 5 is a local structural schematic view of a backlight unit according to a fourth embodiment of the present invention.

FIG. 5 shows a local structural schematic view of a backlight unit according to a fourth embodiment of the present invention. As shown in FIG. 5, in order to improve the utilization rate of the light emitted by the light emitting element 20 further, the light guide plate 11 has a gap at the junction of the first inclined side A and the lower bottom surface 111, in such a case, the backlight unit may further comprise a wedge-shaped block 27 for filling the gap, so that the wedge-shape block 27 forms a gap inclined surface C between the first inclined side A and the lower bottom surface 111. The light emitting element 20 can be arranged on the gap inclined surface C. Specifically, a second groove can be arranged on the gap inclined surface C, and then the light emitting element 20 is arranged in the second groove. It should be explained that the material constituting the wedge-shaped block 27 may be at least one of the metal aluminum, the metal tin and the metal silver.

In this way, as shown in FIG. 5, the light emitting element 20 can be inclined for a preset angle relative to the lower bottom surface 111, such that more emitted light can be reflected at the surface of the first reflector 21, and then enter into the light guide area F of the light guide plate 11, thereby increasing the utilization rate of the light.

In addition, the present invention further provides a display device comprising any of the backlight units as stated above according to the embodiments of the present invention, hence, the display device has the same beneficial effect as the backlight units provided by the preceding embodiments.

It should be noted that in the embodiments of the present invention, the display device may comprise a liquid crystal display device, for example, the display device may be any product or component having the display function such as a liquid crystal display, a liquid crystal television, a digital photo frame, a mobile phone or a tablet computer etc.

What are stated above are only specific implementations of the present invention, however, the protection scope of the present invention is not limited to this, variations or replacements that can be easily conceived by any skilled person familiar with the present technical field within the technical scope disclosed by the present invention should all be covered within the protection scope of the present invention. Therefore, the protection scope of the present invention should depend on the protection scope of the claims.

The invention claimed is:

1. A backlight unit, comprising:
   a light guide plate, the light guide plate comprising a first inclined side and an upper bottom surface and a lower bottom surface parallel with each other, wherein the angle between the first inclined side and the lower bottom surface is a sharp angle, and wherein the first inclined side is a curved surface;
   a light emitting element, the light emitting element being arranged below the first inclined side; and
   a first reflector, the first reflector being arranged on a surface of the first inclined side.

2. The backlight unit according to claim 1, wherein a first groove is arranged at a position of the lower bottom surface of the light guide plate below the first inclined side, and the light emitting element is arranged within the first groove.

3. The backlight unit according to claim 1, wherein the shape of the first reflector is same as the shape of the first inclined side.

4. The backlight unit according to claim 1, wherein the backlight unit further comprising: a second reflector arranged on the lower bottom surface of the light guide plate.

5. The backlight unit according to claim 4, further comprising a heat sink arranged at the underside of the second reflector.

6. The backlight unit according to claim 4, wherein an opening is arranged at a position of the second reflector corresponding to the light emitting element for exposing the light emitting element, and the backlight unit further comprises a first heat conduction reflector arranged at the opening and fitted with the light emitting element.

7. The backlight unit according to claim 1, wherein the side of the light guide plate opposite to the first inclined side is a second inclined side, the second inclined side has a same shape as the first inclined side, and the second inclined side and the first inclined side are parallel with each other.

8. The backlight unit according to claim 7, further comprising: at least two mutually spliced light guide plates, wherein the first reflector is clamped between the second inclined side of one of two adjacent light guide plates and the first inclined side of the other light guide plate.

9. The backlight unit according to claim 8, wherein the first reflector clamped between two adjacent light guide plates is a double side reflector.

10. The backlight unit according to claim 1, wherein the light emitting element comprises a control circuit board and an LED chip arranged on the control circuit board, and a light exit side of the LED chip faces towards the first inclined side.

11. The backlight unit according to claim 10, further comprising: a second heat conduction reflector, the second heat conduction reflector being arranged at a side of the LED chip close to the first inclined side.

12. The backlight unit according to claim 1, wherein the light guide plate has a gap at the junction of the first inclined side and the lower bottom surface, and the backlight unit further comprises a wedge-shaped block for filling the gap, wherein the light emitting element is arranged on a gap inclined surface of the wedge-shaped block formed between the first inclined side and the lower bottom surface.

13. The backlight unit according to claim 12, wherein a second groove is arranged at the gap inclined surface, and the light emitting element is arranged within the second groove.

14. A display device, comprising a backlight unit according to claim 1.

* * * * *